Dec. 20, 1955  R. M. PALMER  2,727,474
UNIVERSAL ROTATIONAL ACTION APPARATUS
Filed April 17, 1953  6 Sheets-Sheet 1
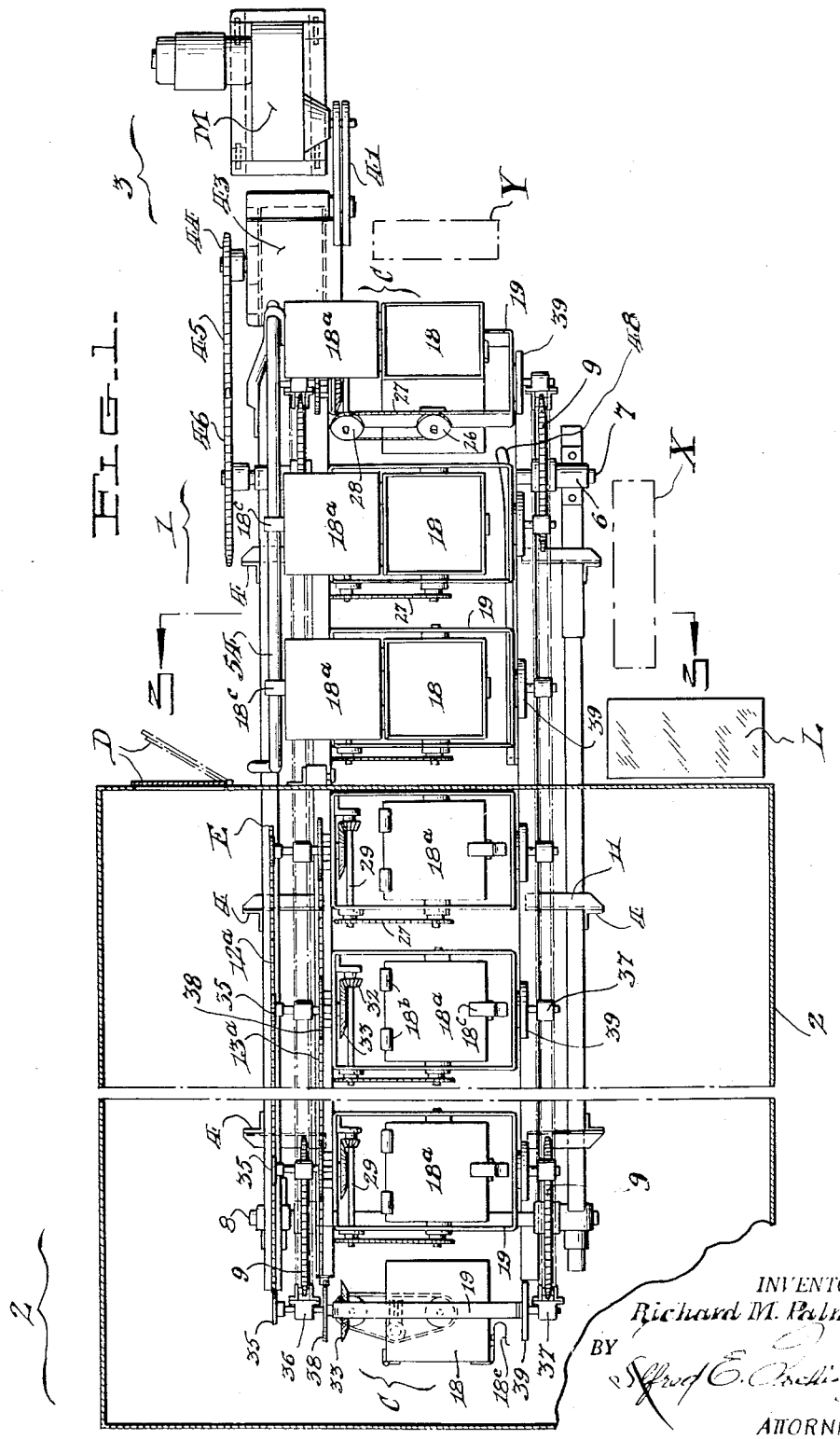
INVENTOR:
Richard M. Palmer,
BY
ATTORNEY.

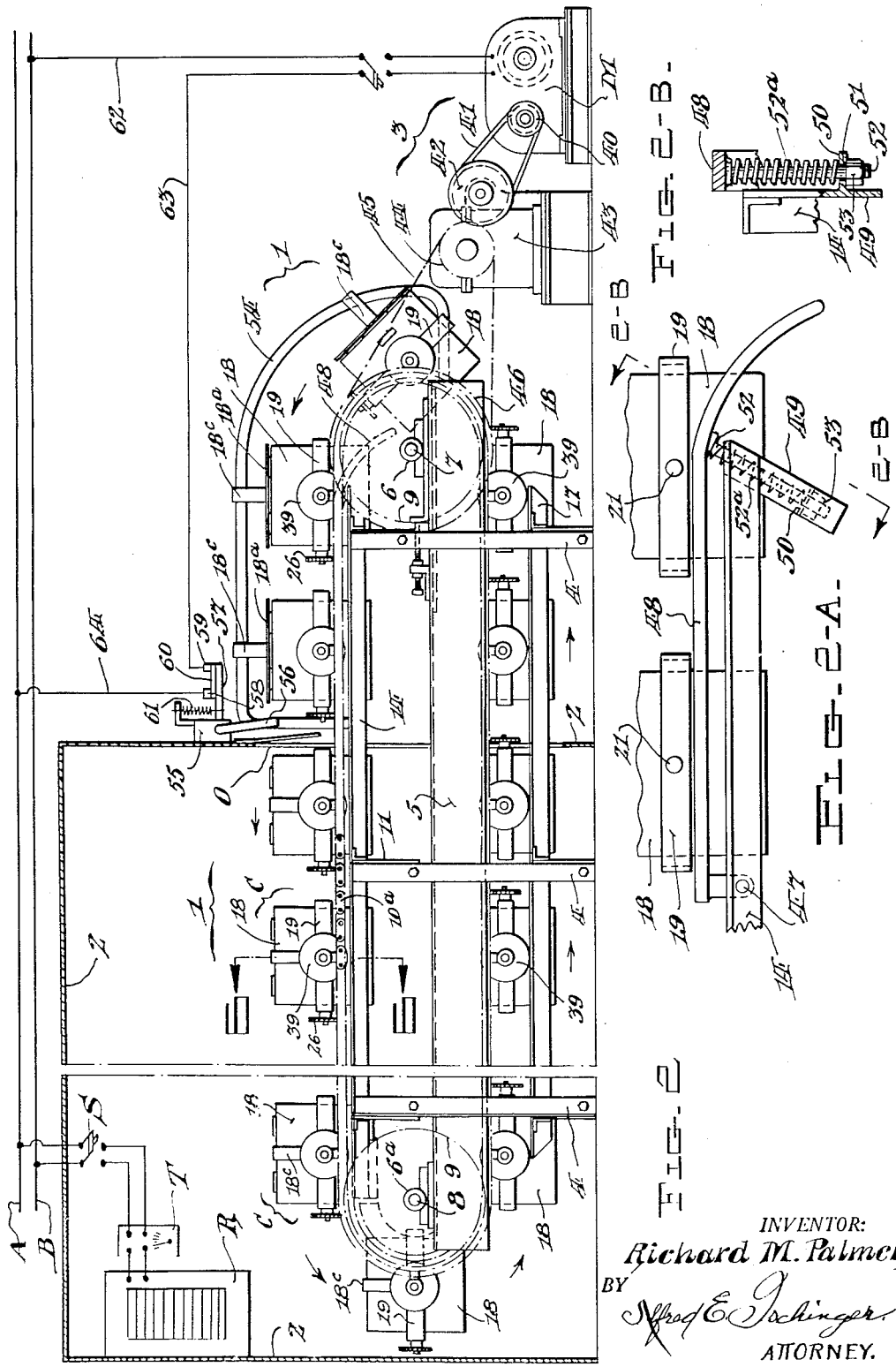

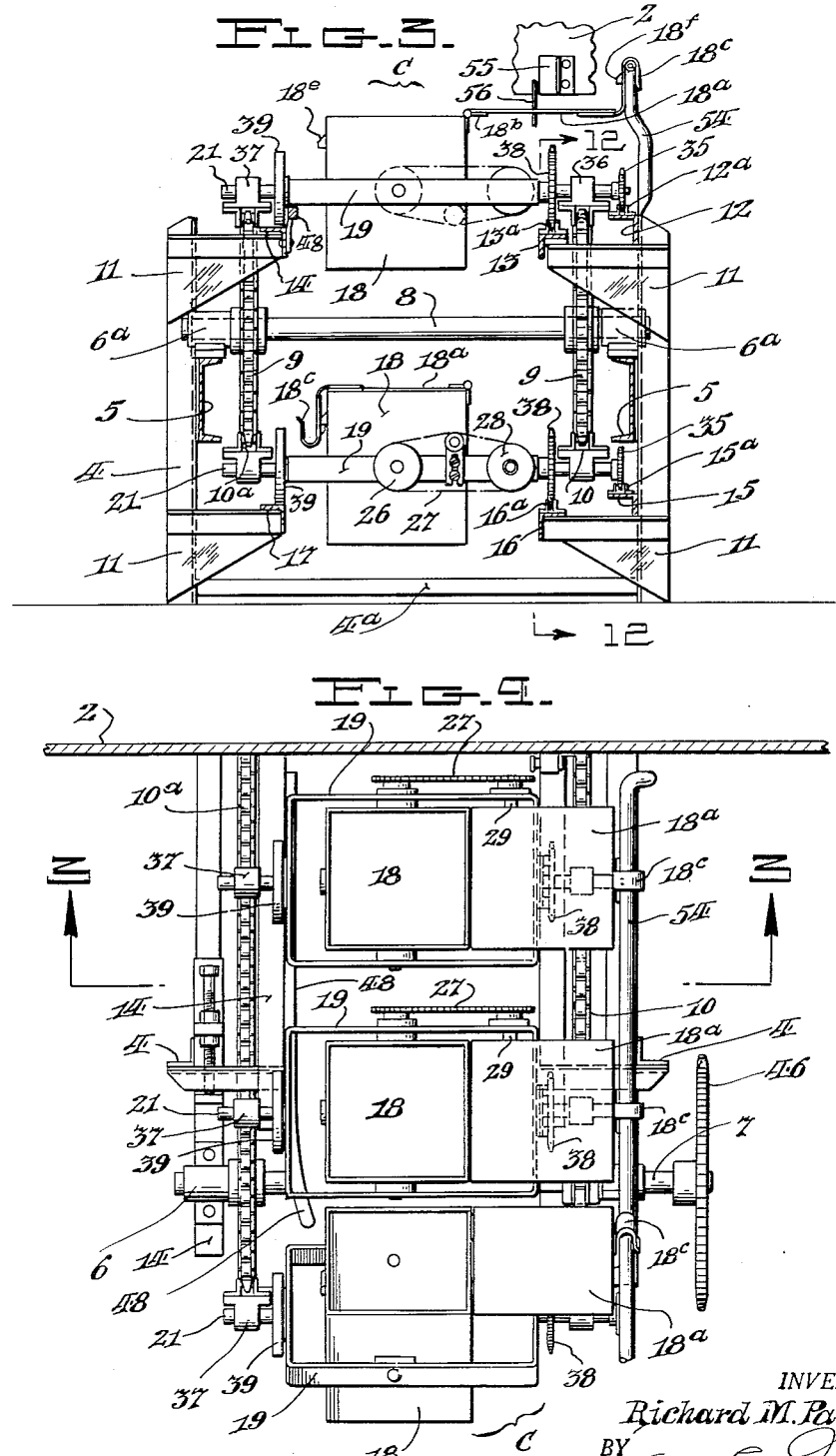

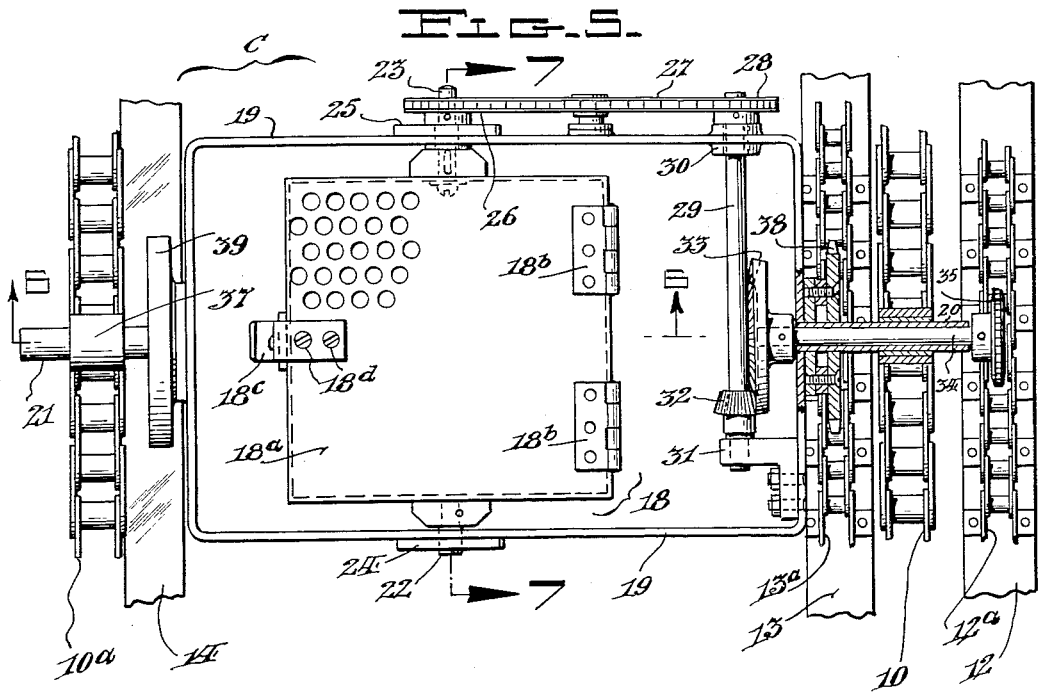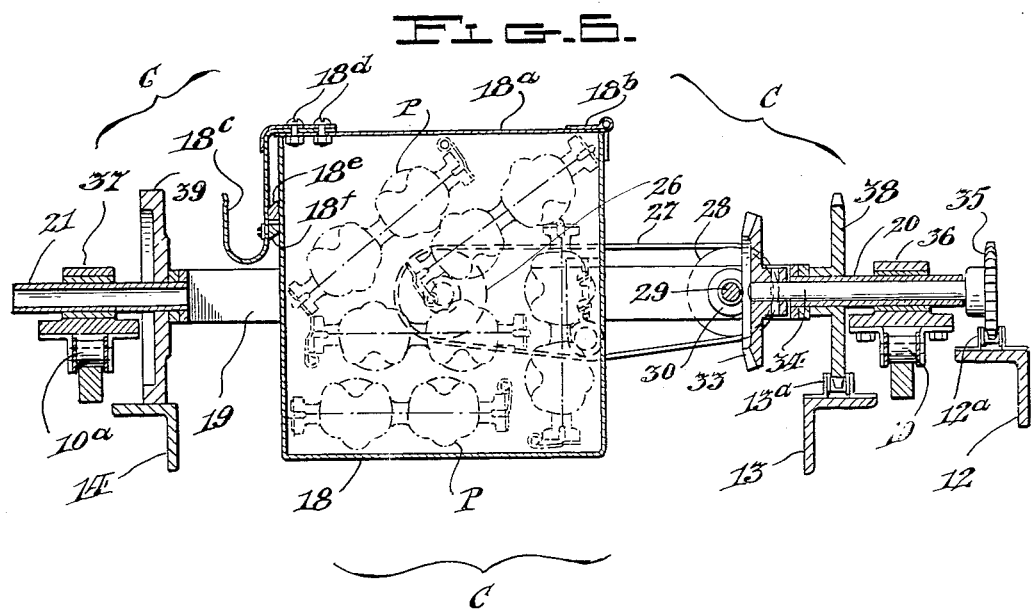

Dec. 20, 1955   R. M. PALMER   2,727,474
UNIVERSAL ROTATIONAL ACTION APPARATUS
Filed April 17, 1953   6 Sheets-Sheet 5
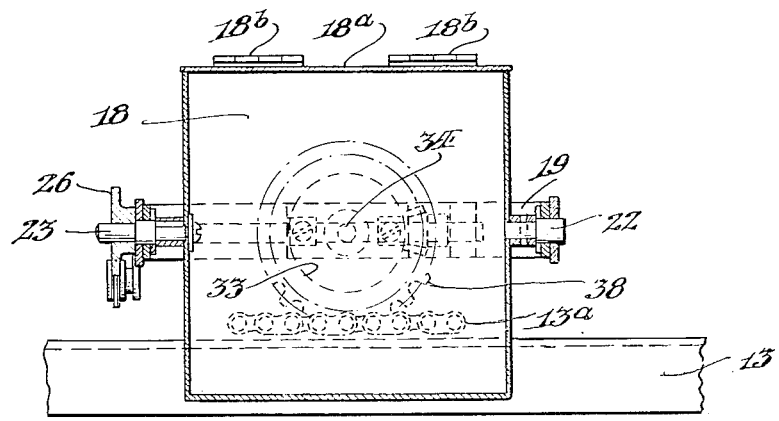
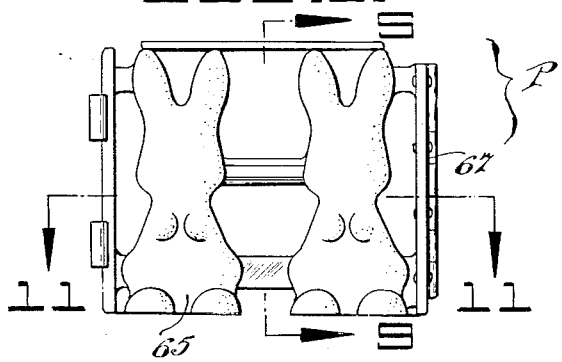 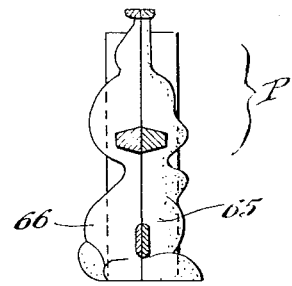
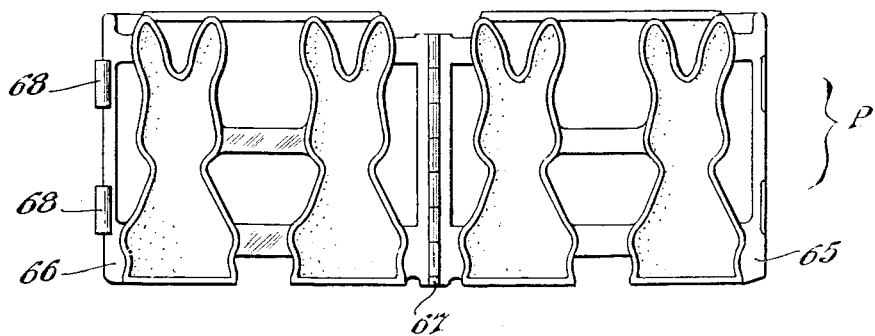
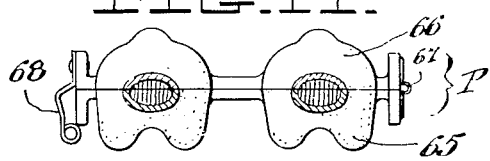
INVENTOR:
Richard M. Palmer;
BY
Alfred E. Dieringer.
ATTORNEY.

Dec. 20, 1955 R. M. PALMER 2,727,474
UNIVERSAL ROTATIONAL ACTION APPARATUS
Filed April 17, 1953 6 Sheets—Sheet 6
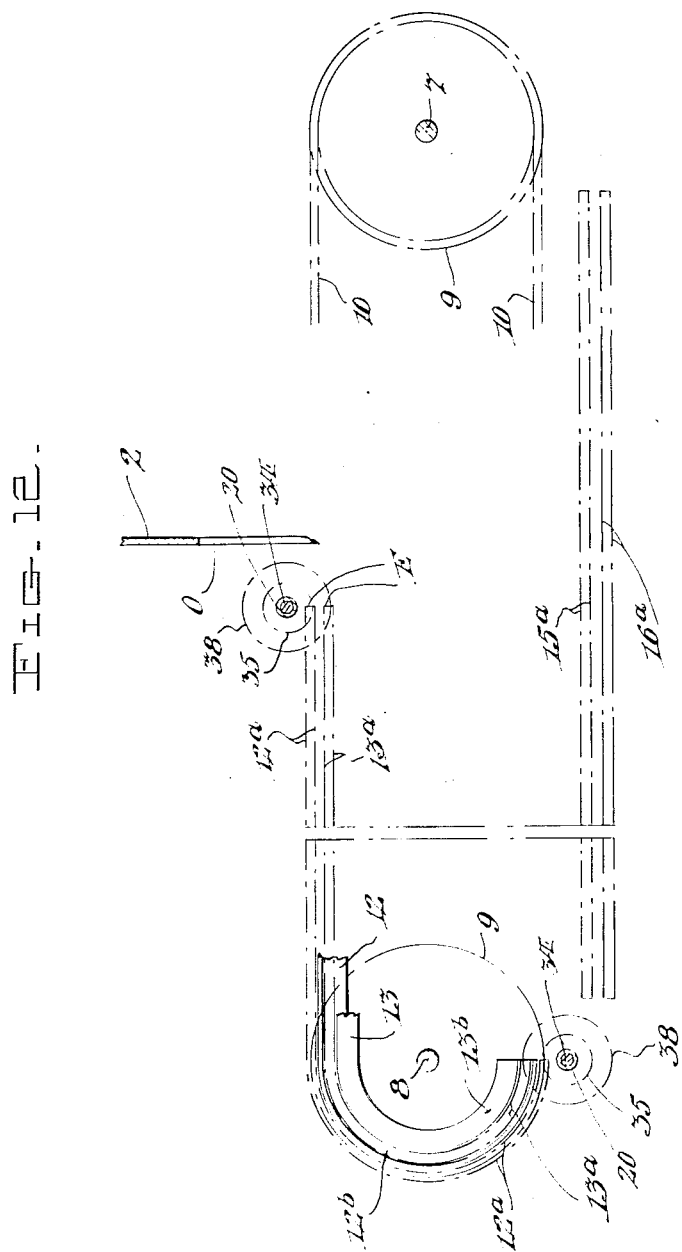
INVENTOR:
Richard M. Palmer,
BY
Alfred E. Dieringer,
ATTORNEY.

United States Patent Office 2,727,474
Patented Dec. 20, 1955

2,727,474

UNIVERSAL ROTATIONAL ACTION APPARATUS

Richard M. Palmer, Wyomissing, Pa.

Application April 17, 1953, Serial No. 349,405

10 Claims. (Cl. 107—8)

This invention relates to machinery having one or more containers that are universally gyrated for the purpose of effecting tumbling or molding action of the container contents, and more particularly concerns an apparatus of this type which is arranged to effect such tumbling or molding action in a special manner and while the containers move along a predetermined path of travel between their loading and unloading stations where the containers are subjected to a certain condition affecting the contents of the containers, but which condition does not prevail at said stations.

One object of my invention is to provide a novel apparatus of the type indicated.

Another object is to provide such an apparatus which has certain structural and functional features of advantage over the similar machinery of the prior art.

A further object is to provide such as apparatus having novel means for effecting universal gyration of the containers in a certain unique manner.

Another object is to provide such an apparatus in which the containers may be loaded with molds so as to effect the molding of articles which are desired to have their surfaces fit tightly against the entire mold walls.

An additional object is to provide such as apparatus which is equipped with novel means adapted to facilitate the loading and unloading of the containers.

Another object is to provide such an apparatus in which the containers move along a predetermined path of travel within a housing where the containers are subjected to conditions affecting the contents of the containers, such as a relatively low temperature condition, whereas the container loading and unloading stations are located outside of said housing so that the operator or operators active at said stations are unaffected by said conditions.

A still further object is to provide such an apparatus having novel safety means which functions to prevent operation of the apparatus unless the container loading procedure has been properly completed.

Another object is to provide such an apparatus in which the containers are revolved about two different axes simultaneously during their movement along a predetermined path of travel.

It is also an object to provide such an apparatus in which the containers are revolved about one axis at one rate of speed and about a second axis at another rate of speed during their movement along said predetermined path of travel.

Another feature of my invention resides in the provision of such an apparatus which is particularly adapted for use in the manufacture of hollow confectionery articles, such, for example, as hollow chocolate articles resembling a rabbit, duck, lamb, etc., as illustrated by my U. S. design patents, identified as follows: Des. 157,621, Mar. 7, 1950; Des. 161,521, Jan. 2, 1951; Des. 161,522, Jan. 2, 1951; Des. 161,865, Feb. 6, 1951.

Another object is to provide such an apparatus by which a distribution of the molded material of proper thickness against the wall of the molds within the containers will always be attained, the particular thickness being, of course, dependent on the character and/or shape of the figure being molded so that no thin spots or incipient cracks will be formed in said articles.

With these and other objects in view, which will become more apparent from the following detailed description of one practical and illustrative embodiment of my improvements depicted in the accompanying drawings, the invention resides in the novel apparatus, elements, features of construction and arrangement of parts in cooperative relationship, as herein disclosed and more particularly defined by the hereto appended claims.

In the accompanying drawings:

Figure 1 is a partial plan view of an apparatus in accordance with my invention.

Fig. 2 is a side elevational view, partly in section, of the apparatus shown in Fig. 1.

Fig. 2–A is a partial elevational detail view, on an enlarged scale, of certain parts shown in Fig. 2.

Fig. 2–B is a detail sectional view, taken substantially as indicated by the arrows 2–B, 2–B, on Fig. 2–A.

Fig. 3 is an elevational sectional view, taken substantially as indicated by the arrows 3—3 on Fig. 4.

Fig. 4 is a plan view of a portion of the front end of the apparatus shown in Fig. 1.

Fig. 5 is a plan view, on an enlarged scale, of one of the apparatus containers and the revolving mechanism therefor.

Fig. 6 is an elevational sectional view, taken substantially as indicated by the arrows 6—6 on Fig. 5.

Fig. 7 is a detail elevational sectional view, taken substantially as indicated by the arrows 7—7 on Fig. 5.

Fig. 8 is an enlarged front elevational view of one form of mold of the type which can be placed in the containers of my novel apparatus to effect the production of a hollow confectionery or chocolate article.

Fig. 9 is an elevational sectional view of the mold shown in Fig. 8, taken substantially as indicated by the arrows 9—9 on the latter.

Fig. 10 depicts the mold of Fig. 8 as it appears when opened, and

Fig. 11 is a transverse sectional view through the mold shown in Fig. 8, taken substantially as indicated by the arrows 11—11 on the latter.

Fig. 12 is a partial detail sectional view of a certain stationary chain arrangement, taken substantially as indicated by the arrows 12—12 in Fig. 3, certain parts only being indicated schematically for simplified orientation.

It will be helpful to a clear understanding of my invention to first briefly consider some of the more important aspects and phases thereof, so that these may be kept in mind in connection with the detailed description of an exemplary and practical embodiment of my invention shown in the accompanying drawings.

Accordingly, it is noted that, heretofore, it was the general practice to operate chocolate article molding machines in a room, or in a confined place, in which the temperature was kept at a relatively low point necessary to the proper setting, or hardening, of the chocolate in connection with its molding formation into a desired shape or article. The operators serving such machines were consequently exposed to a working condition involving relatively low temperature surroundings, with the result that work losses from illness and difficulties in obtaining employees for this type of work, was an ever present problem in this field. My novel apparatus eliminates these difficulties and detrimental consequences in that the operators of my apparatus perform their work in a room kept at a normal or comfortable temperature, while the molding action carried out by the apparatus takes place during movement of the molds along a predetermined path of travel within a housing in which the temperature is reduced to the desired, or required degree.

The universal gyration of molds to form hollow confectionery articles of the type previously indicated will bring about best results if the gyrations of the molds are effected with regard to the shape and size of the articles to be molded. For example, I have found in practice that substantially perfect formation of the hollow chocolate articles of the type exemplified by my previously listed design patents will be attained if, during formation of such articles, the molds are revolved universally, but in such manner that the rotary movement components are in a certain time phase relationship, i. e., in such manner that rotary movement of the molds in one direction takes place at a different rate of speed than rotary movement of the molds in another direction. My novel apparatus is adapted to effect universal gyration, or rotation of the molds, in this manner.

Difficulties have also been experienced with prior art molding or tumbling machines due to the absence of safety features in such machines. For example, such machines could be inadvertently operated, or set in motion, before the loading procedure had been properly completed, with the result that either the operator was injured, or the machine was damaged, or both. My novel apparatus is provided with safety means which prevents such difficulties.

The apparatus of my invention also embodies a unique container unit and novel operating means therefor, as well as other special features, such as an arrangement at the container loading and unloading location for maintaining the containers in upright position while maintaining the lids of the containers in open position, in conjunction with means adapted to effect guided and cushioned movement of the container units along their loading and unloading stations.

Referring now to the illustrative and practical form of my invention shown in the accompanying drawings, in which similar parts are identified by corresponding reference characters, the apparatus, in general, comprises a machine unit 1, an enclosure or housing unit 2, and a power unit 3. These units will be consecutively described in detail.

The machine unit 1 comprises a frame structure including oppositely arranged spaced vertical frame members 4, that are united by cross members 4ª (see Fig. 3) and have lengthwise secured thereto in opposed relation a pair of similar channels 5. Secured to the top of the channels 5, adjacent their ends, are two pairs of shaft bearings 6—6 and 6ª—6ª adapted to have freely journaled therein two shafts 7 and 8 to which are fixedly secured similar sprocket wheels 9 arranged to operate in unison two conveyor chains 10 and 10ª.

The vertical frame members 4 are provided at their upper and lower ends with similar brackets 11, along which are arranged longitudinally extending supporting angles 12, 13, 14, 15, 16 and 17. The supporting angles 12, 13, 15 and 16 have sprocket chains 12ª, 13ª, 15ª and 16ª fixed to their upper surfaces for a purpose which will presently appear and the upper surfaces of the angles 14 and 17 are adapted to have certain rollers, or wheels, travel therealong, as later explained.

Mounted on the conveyor chains 10 and 10ª, for traveling movement therewith, are a multiplicity of similar container units that are generally identified by the letter C. Each of the units C comprises a substantially cubically-shaped container 18, a container surrounding frame 19, from one side of which extends a sleeve bearing 20 and from the opposite side of which extends a stud shaft 21. Centrally secured to project from the opposite sides of the container 18 are stud shafts 22 and 23 which respectively extend through bearings 24 and 25 attached in oppositely aligned positions to the frame 19. The stud shafts 22 and 23 are arranged to freely rotate in the bearings 24 and 25 and the outer end of the shaft 23 has secured thereto a sprocket wheel 26 that is rotatively operated by a chain 27 trained about a sprocket wheel 28 on a shaft 29 arranged to freely revolve in bearings 30 and 31 fixed to the frame 19. Secured to one end of the shaft 29 is a bevel gear 32 which meshes with a bevel gear 33 fixed to a shaft 34 that extends through the sleeve bearing 20 and has a sprocket wheel 35 secured to its outer end. The sprocket wheel 35 meshes with the stationary chains 12ª and 15ª mounted respectively on the angles 12 and 15.

The sleeve bearing 20 extends through and is rotatable in a bearing support 36 which is attached to the conveyor chain 10 and the stud shaft 21 extends through and is rotatable in a similar bearing support 37 attached to the conveyor chain 10ª.

A sprocket wheel 38 is attached to the frame 19 and is adapted to mesh with the stationary chains 13ª and 16ª respectively, secured to the top surfaces of the angles 13 and 16, and a wheel 39 is secured to the frame 19 for travel along the top surfaces of the angles 14 and 17.

At the left end of the machine unit 1, as seen in Fig. 2, the angles 12 and 13 are provided with extensions 12ᵇ and 13ᵇ that curve in semi-circular manner downwardly to an ending point directly below the shaft 8, and the stationary chains 12a and 13a continue along the outer surfaces of these extensions in correspondingly curved relation with the conveyor chains 10 and 10ª (see Fig. 12).

The starting end of each of the stationary chains 12ª and 13ª is located just inside of the housing unit 2, as indicated by the letter E in Figs. 1 and 12 and the said chains are positioned along the top surfaces of the angles 12 and 13 as well as the outer surfaces of said semi-circular extensions 12ᵇ and 13ᵇ to an ending point directly below the shaft 8. The stationary chains 15ª and 16ª are mounted, respectively, along the top surfaces of the angles 15 and 16, from one end thereof to the other, and said chains 15ª and 16ª are in perpendicular alignment with the stationary chains 12ª and 13ª, as clearly shown in Fig. 3.

Each of the containers 18 is open at its upper end and has a lid 18ª connected thereto by hinges 18ᵇ. At the forward end the lid 18ª is provided with a hook-shaped latch and handle member 18ᶜ, formed of spring sheet material. The upper end of the member 18ᶜ is fixedly attached to the lid in suitable manner, as by screw bolts 18ᵈ, indicated in Fig. 6. A projecting element 18ᵉ is secured to the outside of the front wall of the container 18 and a locking or latch element 18ᶠ is secured to the member 18ᶜ as shown in Fig. 6, the said elements, respectively, being provided with an upper cam surface and a lower cam surface so that when closing the lid 18ª by pressing it downwardly on the container 18, the said cam surfaces will first contact each other and then cause the member 18ᶜ to be bent outwardly until the element 18ᶠ has passed the element 18ᵉ and dropped into locking position therebelow as shown in Fig. 6. To open the lid the hook-shaped latch and handle member 18ᶜ is first pulled outwardly until the element 18ᶠ is beyond the element 18ᵉ, after which the lid can be raised. The walls of the container 18 and the lid 18ª are preferably formed of metallic sheet material that is either solid or provided with circular perforations throughout its entire extent, as partly indicated on the lid 18ª in Fig. 5, but said container walls and lid may also be formed of other material which permits air circulation therethrough, such as a rigid mesh material.

As shown in Figs. 1 and 2, the enclosure or housing unit 2 is so arranged relative to the machine unit 1, that the front end portion of the latter extends beyond the outside of the housing unit 2 and the other part of the machine unit 1 is within the housing unit 2. It is noted that the front end portion of the machine unit 1 which extends beyond the outside of the housing unit 2, is so arranged as to facilitate unloading and loading of the containers 18 at this location, which location constitutes the unloading and loading stations of the apparatus where the operator, or operators serve the machine, as hereinafter described.

The housing unit 2 forms a room, or chamber, which entirely encloses the machine part that extends thereinto through the wall opening at the front end thereof, indicated by the letter O. A door D is provided at one side of the front end of the housing unit 2, for access to the interior of the latter. On the inside of the housing unit 2 is provided a standard form, or type, of electrically operated refrigeration unit R, which may be located as desired to effect control of the temperautre within the housing unit and reduction of the temperature to the desired point for best results in connection with the molding operation performed by the machine unit part positioned within the housing unit 2. The unit R is controlled in well known manner by a thermostat unit T electrically connected as indicated in Fig. 2 through a switch S, with a source of electrical energy represented by the main line conductors A and B.

The power unit 3 generally comprises a standard type motor unit M having a drive wheel 40 arranged at one side thereof which is connected by a belt or chain 41 with a driven wheel 42 of a standard or conventional type change speed unit 43. A drive wheel 44 is arranged at one side of the unit 43 which wheel 44 is connected by a chain 45 with a sprocket wheel 46, fixed to the shaft 7 to which are also secured the two sprocket wheels 9 that drive the conveyor chains 10 and 10ª.

As previously indicated, the front end portion of the machine unit 1 that extends beyond the outside of the housing unit 2, is located in a factory, or other enclosure, where the temperature is maintained at normal room temperatures and said front end portion of the machine unit 1 is arranged to be served by the operator, or operators, of the apparatus, to effect unloading and loading of the containers 18 and to carry out the other requirements.

In practice, it has been found that the apparatus can be most efficiently served by two operators stationed approximately at the locations X and Y indicated in dot-and-dash outline in Fig. 1. Adjacent the location X is provided a table L on which the loaded molds, or other items, are supported, or stacked, that are to be placed by the operator at station X into the open containers 18. The operator at station Y opens the containers 18 and removes the molds, or other items, therefrom, after the containers 18 have been moved along their predetermined path of travel by the apparatus. For convenience, the said locations X and Y will hereinafter be designated respectively as the "loading station" and the "unloading station."

Rotation of the container units C stops directly after the sprocket wheels 35 and 38 become disengaged from the ends of the stationary chains 15ª and 16ª, at the front end of the machine unit where the units C travel from their lower return motion level to their upper advancing motion level and until the sprocket wheels 35 and 38 become reengaged with the stationary chains 12ª and 13ª, at their front ends E located just inside the front end of the housing unit 2. In other words, the container units C are not rotated and are in free floating condition while being advanced by the conveyor chains 10 and 10ª from the point where the stationary chains 15ª and 16ª end and the stationary chains 12ª and 13ª begin, this being the place at the front end of the machine unit 1 where the machine operators perform their container unloading and loading activities at the stations X and Y. During this period of non-rotational advancement of the container units C and while the containers 18 are in free floating condition, the lid 18ª of each advancing container 18 is first opened by the operator at station Y and then the contents of the container is removed by the same operator and placed on some means of conveyance for transportation to another location for further attention, such as a traveling belt or conveyor, not shown. Directly thereafter, the operator at loading station X first refills each advancing container 18 and then, just prior to the advancement of the units C into the housing unit 2, through the opening O, the said operator closes the lid 18ª of the container 18.

In order that the containers 18 may be conveniently maintained in upright position during this unloading and loading period and the container lids 18ª maintained in open position, the machine unit 1 is provided with certain mechanical arrangements more particularly disclosed in Figs. 1, 2, 2–A, 3 and 4. Pivotally connected at 47, near the front end of the angle 14, is an elongated bar 48 having a curved portion at its front end, as clearly shown in Fig. 2–A. Fixed to the forward extremity of the angle 14 is a plate bracket 49 having an integral laterally projecting flat shelf-like element 50 provided with a central aperture 51 through which extends a rod 52, the upper end of which is secured to the bar 48 and the lower end of which is threaded for engagement thereon of an adjusting nut 53. A spiral compression spring 52ª is interposed between the bar 48 and the element 50 which spring functions to maintain the bar 48 in yieldable position as shown in Fig. 2–A. As a container unit C moves upwardly at the front of the machine unit 1, it automatically tends to change from its upside-down, or inverted position, to upright position while in free floating condition. At about this time the operator at the unloading station Y opens the lid 18ª of the container 18, and swings the lid to completely open position by engaging the hook-shaped handle 18ᶜ thereof over a stationary guide bar or tubular member 54, the forward lower end of which is secured to one of the side channels 5 and the upper rearward end is secured to the angle 12. The hook-shaped lid handle 18ᶜ then slides along the stationary guide bar 54, during its advancing movement along the loading station X, and throughout this entire period the lid 18ª is maintained open and the container thereby first turned to and then maintained in an upright position, as indicated in Figs. 2, 3 and 4. Also, in connection with this advancing movement of the container unit C, and more particularly during its final turning movement to final upright position at the front end of the machine unit 1, the frame 19 of the container unit C comes in contact with the yieldable guide bar 48, so that the unit C is steadied in its turning movement to final upright position by the cushioning or shock absorber action of the yieldable guide bar 48.

After a respective container 18 has been unloaded and loaded by the operators at the stations X and Y, as indicated, and directly before a respective loaded container unit C is advanced by the conveyor chains 10 and 10ª into the housing unit 2, through the opening O, the lid 18ª of the container 18 is closed by the operator at the loading station X.

In the event that the operator fails to move the lid 18ª to closing position on the container 18, before it enters the housing opening O, the electrical motor circuit of the machine operating unit 3 will be opened and the apparatus will come to a standstill. The safety arrangement provided to accomplish this result comprises an electrical switch unit 55 which is mounted on the housing unit 2, from which switch unit dependingly extends a pivotally mounted trip arm 56, as shown in Figs. 2 and 3. The electrical connections of the switch unit 55 are diagrammatically indicated in Fig. 2 and comprise a switch arm 57 which is adapted to establish an electrical connection between two switch poles 58 and 59 by means of a bridging conductor element 60 fixed on and insulated from the arm 57. The arm 57 is pivotally connected in the switch unit so as to move with the trip arm 56 and said arms are held in their switch closing position by suitable means such as a tension spring 61. The electrical circuit for the drive unit 3 is also diagrammatically indicated in Fig. 2 and comprises a conductor 62 which directly connects one pole of the motor of the drive unit 3 with the main line B of the electrical source of supply, a conductor 63 which extends from the second pole of the motor to the switch pole 59 and a conductor 64 which connects the switch pole 58 with the main line A. In the event that the lid 18ª of a container 18, is inadvertently permitted to remain open as the container unit C is about to enter the housing opening O, the leading edge of the lid 18ª will push against the trip arm 56 of the switch unit 55 and this will cause the arm 57 to move downwardly so as to move the bridging element 60 away from the switch poles 58 and 59 and thereby open the motor circuit. When the lid 18ª of a respective container 18 is properly closed, before it reaches the housing opening O, the lid 18ª will pass below the trip arm 56 and the machine unit 1 will continue to operate. Of course, it is to be understood that other standard electrical switches or equipment are, or may be, connected in the circuits illustrated in Fig. 2, as desired, or required, to establish an electrical control system for the apparatus in accordance with the usual practice followed, such standard or usual equipment not being indicated in the drawings to avoid disclosure of subject matter not necessary to the understanding of the invention here involved.

Since the illustrative embodiment of my invention, as herein disclosed, is particularly intended and adapted for use in the manufacture of confectionery articles, such as hollow chocolate articles, of the type forming the subject matter of my previously listed design patents, the containers 18 are shown as being of such size and shape as to readily accommodate therein a multiplicity of molds used for this purpose, such as the mold generally indicated by the letter P in Figs. 8 to 11 inclusive. Such molds are usually formed of metal and may comprise two complementary sections 65 and 66, which respectively include two similar front and rear sections of the same type mold shape, each of which sections is provided with a front and rear cavity simulating the outward appearance of the front and rear of a rabbit as shown, or some other animal, or object. The sections 65 and 66 are centrally joined by a hinge arrangement 67 and one or more spring metal latch elements 68 are arranged along one edge for locking the sections together, as indicated in Fig. 11.

When using such molds P in connection with my novel apparatus, a mass of chocolate in heated molten form is first poured into the duplicate parts of a respective mold section 65 or 66, while the mold is open, as shown in Fig. 10, and the mold is then closed so that the mold sections are locked together by the latches 68, as shown in Figs. 8, 9 and 11. The molds are then placed and arranged in the containers 18, as indicated in Fig. 6, in such manner that very little or no shifting movement thereof takes place during their universal gyration by the container units C, as the latter move through the housing unit 2, along their predetermined path of travel, back to the unloading station of the machine unit 1.

Operation

The proper temperature is first established in the housing unit 2, for conditioning of the contents of the containers 18, as they are conveyed along their predetermined path of travel through said housing unit. Assuming that the containers 18 are to be loaded with molds P for producing hollow chocolate articles of the type previously indicated, then the temperature in the housing unit 2 is established at about 38 degrees Fahrenheit and the thermostat control T is set to maintain this temperature during use of the apparatus.

The driving unit 3 is arranged to operate the conveyor chains 10 and 10ª at a speed which will cause movement of a respective container 18 along its entire path of travel within the housing unit 2, in about fifteen minutes.

The relationship of each container unit sprocket wheel 38, which effects rotation of the container unit C in the direction of its travel in conjunction with the stationary chains 13ª and 16ª, and each container unit sprocket wheel 35, which effects rotation of the container unit C in a right-angular direction relative to its direction of travel in conjunction with the stationary chains 12ª and 15ª, is such, that one complete revolution of the container unit C will take place in its direction of travel during the same period of time that the container unit C rotates four times in said right-angular direction. In other words, the rotational ratio of the container units C is preferably fixed at four to one when the apparatus is to be used for the purpose indicated, namely, to produce hollow chocolate articles. Obviously, this rotational ratio can be changed, if desired, by making appropriate changes in the sprocket wheel and stationary chain arrangement indicated.

With the foregoing arrangements prevailing, the operator at loading station X fills the container 18 that is positioned just outside of the housing opening O, with chocolate loaded molds P taken from the table L. The open lid of said container 18 is then unhooked from the stationary guide bar or tube 54 and brought into closed and latched relation with the container 18. The machine unit 1 is then set in motion so that the first loaded container slowly moves into the housing unit 2 through the opening O, and begins its universal rotary motion as soon as the sprocket wheels 38 and 35 become engaged with the stationary chains 13ª and 12ª at the point E. The operator at station X immediately fills the next container 18, then closes the lid thereof, as before, and so on in succession performs this container loading operation.

As the traveling container units C reach the end of the machine unit 1 within the housing unit 2, they move downwardly in a curve and after reaching a point directly below the shaft 8, the container unit sprocket wheels 38 and 35 will become disengaged from the stationary chains 13ª and 12ª. Continued traveling movement of the container units C will promptly effect re-engagement of the container sprocket wheels 38 and 35 with the stationary chains 16ª and 15ª and this will cause the container units C to be rotated in the same manner and in the same rotational ratio as before, but in opposite forward and lateral directions, since the units C are now moving toward the front of the machine unit 1 and the cooperative rotational relation of said sprockets and stationary chains has been reversed. This reversal of the universal rotational movements by the container units C, in nowise affects or disturbs the flow action of the chocolate within the molds P since by this time the chocolate has been properly distributed along the inner walls of the molds P and substantially set by being subjected to the cooling temperature prevailing inside of the housing unit 2.

As the container units C successively reach the front of the machine unit 1 and the container unit sprocket wheels 38 and 35 become disengaged from the stationary chains 16ª and 15ª, the operator at unloading station Y manually regulates the positioning of the containers 18 so as to facilitate opening of the lids 18ª and engagement of the hook-shaped handle 18ᶜ thereof on the guide bar or tube 54, as shown in Fig. 2. At this time and while the containers 18 keep moving forward at their normal slow rate of speed, the operator at station Y removes all the molds P from within a respective container 18 and places them on a conveyor belt, or other means of transportation (not shown), conveniently arranged adjacent to the unloading station Y for this purpose. In other words, the unloading and loading operations performed by the operators at stations Y and X take place while the apparatus is in continuous or uninterrupted operation. Of course, if at any time it becomes desirable or necessary to stop the machine, interruption of the machine operation can be quickly and easily effected by opening the switch while controls the machine drive unit 3.

The molds P which have been removed from the containers 18, as described, are subjected to further cooling treatment, in this instance, by being conveyed through a cooling tunnel (not shown) on a belt conveyor, before they are in readiness to be opened for effecting removal of the finished chocolate article. However, it will be understood that such additional cooling treatment can be eliminated by increasing the length of the path of travel of the containers 18 within the housing 2, so that the molds P are subjected to their entire cooling or setting treatment, as required, while passing through the housing unit 2.

It is to be particularly noted that the operators at the stations X and Y, while serving the apparatus as explained, perform their work at locations outside of the housing unit 2, where a normal or comfortable working temperature condition prevails and may be maintained at all times, thereby providing an arrangement that enables the operators and the apparatus to function at maximum efficiency.

*Modifications*

It will be understood by those skilled in this art that the apparatus specifically shown and described can be changed and modified in various ways without departing from the invention herein disclosed and more particularly defined by the hereto appended claims. For example, the portion of the machine unit 1 within the housing unit 2 can be extended and arranged as desired, or required, to effect a greater or lesser machine capacity and for this purpose the housing unit 2 may also be changed in shape and size so as to properly accommodate therein such different machine arrangement. Furthermore, that the rotational ratio of the container units C can be readily changed by varying the size of the container unit sprocket wheels thereof in relation to the stationary chains with which said sprocket wheels cooperate to effect rotation of the container units C in one, or in both directions. Also, that equivalent means may be substituted for some of the structural elements, parts, or arrangements of the apparatus.

I claim:

1. An apparatus of the character described comprising, a conveyor, a conveyor housing provided with an opening through which a portion of the conveyor extends beyond the outside of said housing, a plurality of container units provided with lids which container units are connected with said conveyor so as to be moved thereby along a predetermined path of travel within and without said housing, means arranged to effect universal gyration of said container units during their movement along said path of travel within said housing, and means arranged to maintain the container units in lid opened upright position during a certain period of their traveling movement outside said housing.

2. An apparatus of the character described comprising, a conveyor, a conveyor housing provided with an opening through which a portion of the conveyor extends beyond the outside of said housing, a plurality of container units provided with lids which container units are connected with said conveyor so as to be moved thereby along a predetermined path of travel within and without said housing, means arranged to effect universal gyration of said container units during their movement along said path of travel within said housing, means arranged to maintain the container in lid opened upright position during a certain period of their traveling movement outside said housing, and means for controlling the temperature within said housing.

3. An apparatus of the character described comprising, a conveyor, a conveyor housing provided with an opening through which a portion of the conveyor extends beyond the outside of said housing, a plurality of container units provided with lids which container units are connected with said conveyor so as to be moved thereby along a predetermined path of travel within and without said housing, means arranged to effect universal gyration of said container units during their movement along said path of travel within said housing, means arranged to maintain the container in lid opened upright position during a certain period of their traveling movement outside said housing, and safety means located adjacent said housing opening which safety means is adapted to be operated by a respective container unit when its lid is in opened position and the container unit is about to enter said housing opening.

4. An apparatus of the character described comprising, a conveyor, a conveyor housing provided with an opening through which a portion of the conveyor extends beyond the outside of said housing, a plurality of container units provided with lids which container units are connected with said conveyor so as to be moved thereby along a predetermined path of travel within and without said housing, means arranged to effect universal gyration of said container units during their movement along said path of travel within said housing, means arranged to maintain the container in lid opened upright position during a certain period of their traveling movement outside said housing, and means arranged to effect stopping of the apparatus which means is arranged to be operated by a respective container unit only when its lid is in opened position and said unit is about to enter the housing opening.

5. An apparatus of the character described comprising, a conveyor, a conveyor housing provided with an opening through which a portion of the conveyor extends beyond the outside of said housing, a plurality of container units provided with lids which container units are connected with said conveyor so as to be moved thereby along a predetermined path of travel within and without said housing, means arranged to effect universal gyration of said container units during their movement along said path of travel within said housing, means arranged to maintain the container in lid opened upright position during a certain period of their traveling movement outside said housing, and electrical switch means located adjacent said housing opening which means is arranged to be operated by a respective container unit only when its lid is in opened position and said unit is about to enter the housing opening.

6. In an apparatus of the character described the combination with a pair of endless conveyor chains that are mounted in laterally spaced parallel relation, and means for effecting traveling movement of said chains in unison; of one or more container units connected with said chains so as to travel therewith in intermediate relation thereto which units include, a container structure formed of perforated material, a mounting frame for the container, means rotatably connecting the container with said frame, and means rotatably connecting said frame with said conveyor chains.

7. In an apparatus of the character described a housing, a pair of endless conveyor elements that are mounted in laterally spaced parallel relation and arranged so as to be partly positioned within the housing and partly positioned outside said housing, means for effecting traveling movement of said elements in unison, one or more container units connected with said conveyor elements in intermediate relation thereto, means for effecting universal rotation of said units during their traveling movement with said elements while within said housing, and means for maintaining said units in upright unloading and loading position during a portion of their traveling movement with said elements while outside of said housing.

8. In an apparatus of the character described a housing, means for controlling the temperature within said housing, a pair of endless conveyor elements that are mounted in spaced parallel relation and arranged so as to be partly positioned within the housing and partly positioned outside said housing, variable speed means for effecting traveling movement of said elements in unison, one or more container units connected with said conveyor elements in intermediate relation thereto, means for effecting universal rotation of said units during their traveling movement with said elements while within said housing, and means for maintaining said units in upright unloading and loading position during a portion of their traveling movement with said elements while outside of said housing.

9. In an apparatus of the character described a container structure including a container provided with an opening through which the container is loaded and unloaded, a lid for closing said opening, hinge means connecting the lid with the container, a guide member engaging element on said lid, means for moving the container structure along a certain path of travel, and a stationary guide member located adjacent said path of travel which member is adapted to be slidingly engaged by said element when the lid of the container structure is in its fully opened position at the location of said guide member.

10. In an apparatus of the character described a container structure including a container provided with an opening through which the container is loaded and unloaded, a lid for closing said opening, hinge means connecting the lid with the container, a guide member engaging element on said lid, means for moving the container structure along a certain path of travel, a stationary guide member located adjacent said path of travel which member is adapted to be slidingly engaged by said element when the lid of the container structure is in its fully opened position at the location of said guide member, and shock absorber means adapted to cooperate with said container structure during its traveling movement while in lid opened position.

References Cited in the file of this patent

UNITED STATES PATENTS

| | | |
|---|---|---|
| 295,434 | Schilling | Mar. 18, 1884 |
| 1,514,029 | Ayliffe | Nov. 4, 1924 |
| 1,812,242 | Jensen | June 30, 1931 |
| 2,108,067 | Lantinberg | Feb. 13, 1938 |

FOREIGN PATENTS

| | | |
|---|---|---|
| 441,098 | Germany | Feb. 25, 1927 |